United States Patent [19]

Tammera et al.

[11] Patent Number: 5,356,219
[45] Date of Patent: Oct. 18, 1994

[54] AERODYNAMIC INSTRUMENTATION PROBE

[75] Inventors: Robert F. Tammera, West Orange; Donald F. Shaw, Denville, both of N.J.

[73] Assignee: Exxon Research and Engineering Company, Florham Park, N.J.

[21] Appl. No.: 129,507

[22] Filed: Sep. 30, 1993

Related U.S. Application Data

[63] Continuation of Ser. No. 937,337, Aug. 31, 1992, abandoned.

[51] Int. Cl.$^5$ .................. G01K 1/10; G01K 1/14; G01K 13/02
[52] U.S. Cl. .................. 374/138; 374/148; 374/135
[58] Field of Search .......... 374/135, 138, 148

[56] References Cited

U.S. PATENT DOCUMENTS

| | | |
|---|---|---|
| 2,414,370 | 1/1947 | Floyd ................. 374/148 |
| 2,450,263 | 9/1948 | Wise ................. 201/63 |
| 2,588,840 | 3/1952 | Howland ................. 374/138 |
| 2,970,475 | 2/1961 | Werner ................. 374/135 |
| 3,000,213 | 9/1961 | Eves et al. ................. 374/138 |
| 3,216,258 | 11/1965 | Spencer et al. ................. 374/138 |
| 3,512,414 | 5/1970 | Rees . | |
| 3,592,061 | 7/1971 | Schwedland et al. . | |
| 4,152,938 | 5/1979 | Danninger ................. 374/148 |
| 4,244,222 | 1/1981 | Hoyer et al. . | |
| 4,403,872 | 9/1983 | DeLeo ................. 374/138 |
| 4,721,533 | 1/1988 | Phillippi et al. ................. 136/234 |
| 4,733,975 | 3/1988 | Komanetsky et al. ................. 374/144 |
| 4,765,751 | 8/1988 | Pannone et al. ................. 374/135 |
| 4,821,566 | 4/1989 | Johnston et al. ................. 374/138 |
| 4,850,717 | 7/1989 | Clark et al. ................. 374/208 |

FOREIGN PATENT DOCUMENTS

| | | | |
|---|---|---|---|
| 1413186 | 8/1965 | France ................. | 374/148 |
| 1046627 | 10/1983 | U.S.S.R. ................. | 374/138 |
| 0788319 | 12/1957 | United Kingdom ................. | 374/135 |

Primary Examiner—Diego F. F. Gutierrez
Attorney, Agent, or Firm—Joseph J. Dvorak

[57] ABSTRACT

The instrumentation probe of the present invention comprises a tubular housing for enclosing a sensing element, the tubular housing being adapted to project into a process stream. The tubular housing is surrounded by an outer casing that has its longitudinal axis transverse to the longitudinal axis of the tubular housing and which outer casing is aerodynamically shaped to be substantially non-disruptive of the flow of the process stream while protecting the tubular housing from erosion.

6 Claims, 2 Drawing Sheets

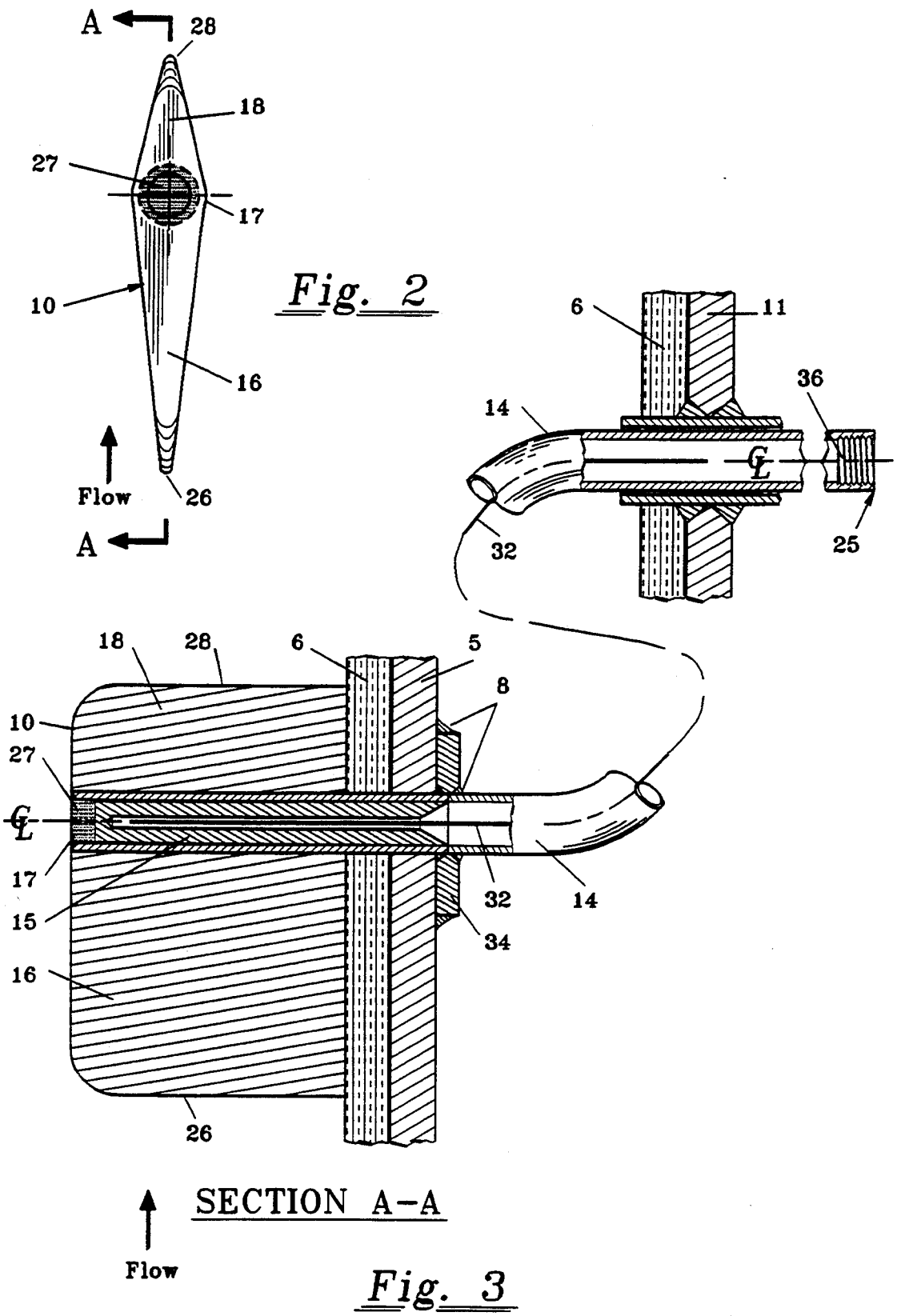

AERODYNAMIC INSTRUMENTATION PROBE

This is a continuation of application Ser. No. 937,337, filed Aug. 31, 1992, now abandoned.

FIELD OF THE INVENTION

The present invention relates to instrumentation probes for use in process streams and especially for sensing temperature in erosive process streams.

BACKGROUND OF THE INVENTION

There are many industrial processes in which it is desirable to sense conditions existing in a process stream by means of a sensor mounted within an instrumentation probe. Typical instrumentation probes consist of a generally tubular housing which projects into the process stream for sensing conditions in the process stream. Frequently, the process stream contains erosive particles, as is the case, for example, in fluid catalytic cracking and similar processes. These erosive particles erode the probe over time, which is highly undesirable. Considerable effort, therefore, has been directed in the process industry toward developing erosion resistant alloys and erosion resistant coatings for instrumentation probes. Notwithstanding these activities, there still remains a need for improved erosion and corrosion resistant instrumentation probes.

Therefore, it is an object of the present invention to provide improved instrumentation probes for use especially in erosive environments.

It is another object of the present invention to provide improvements in instrumentation probes for retrofitting of existing sensor probes.

SUMMARY OF THE INVENTION

Accordingly, the instrumentation probe of the present invention comprises a tubular housing for enclosing a sensing element, the tubular housing being adapted to project into a process stream. The tubular housing is surrounded by an outer casing that has its longitudinal axis transverse to the longitudinal axis of the tubular housing and which outer casing is aerodynamically shaped to be substantially non-disruptive of the flow of the process stream while protecting the tubular housing from erosion.

In a particularly preferred embodiment of the present invention, the outer casing of the instrumentation probe has substantially an air foil shape with a leading edge directing a process stream with its erosive solids around the tubular housing.

These and other embodiments of the present invention, as well as other objects and advantages thereof, will be apparent from the "Detailed Description" which follows, as is illustrated in the accompanying drawings.

BRIEF DESCRIPTION OF THE DRAWINGS

FIG. 2 is a side elevation of the outer casing of an instrument probe of the present invention, showing a particularly preferred aerodynamic design of the casing.

FIG. 3 is a cross-sectional view taken along lines A—A of FIG. 2.

DETAILED DESCRIPTION OF THE INVENTION

Figure 1:
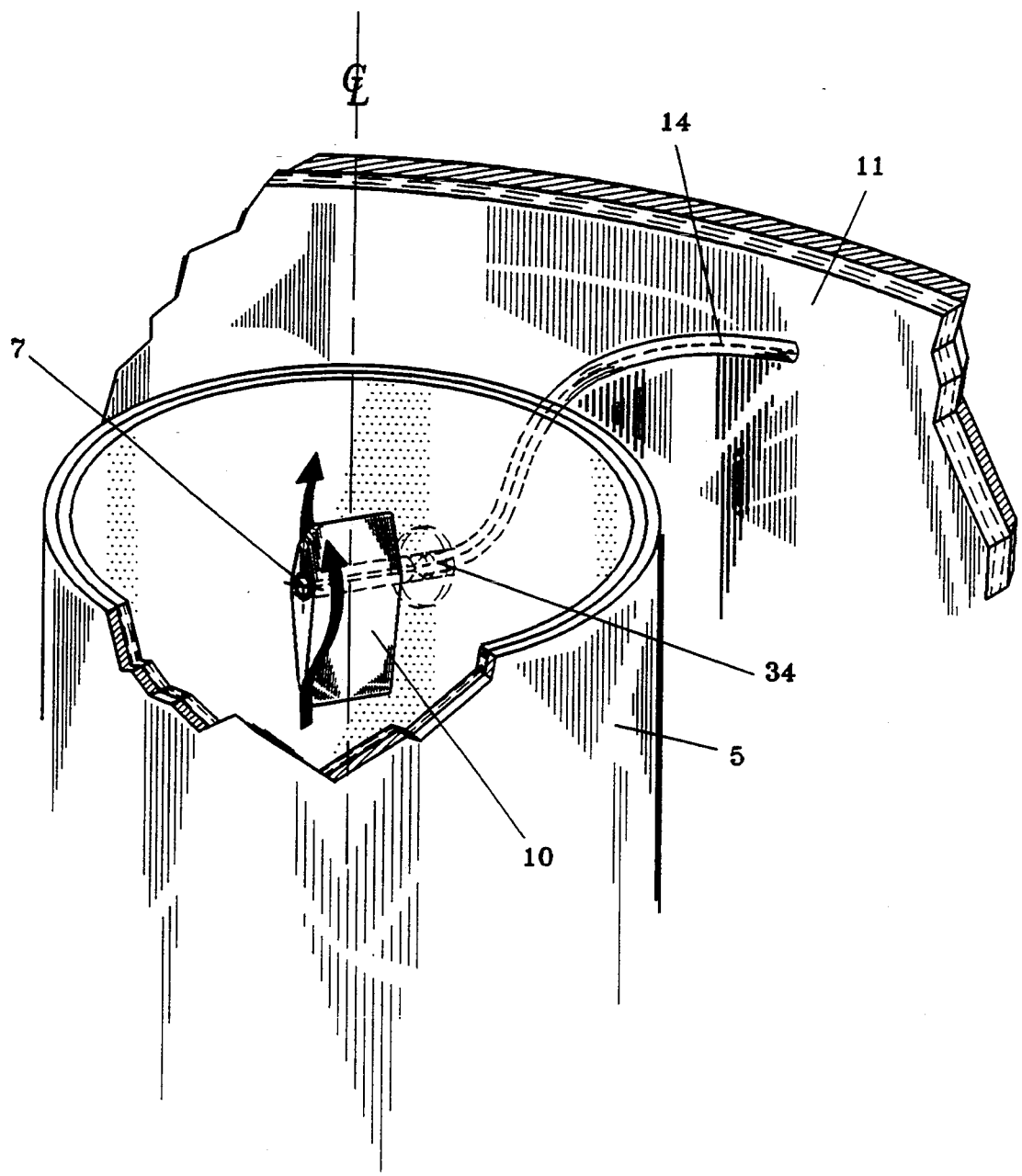
FIG. 1 is a schematic fragmentary illustration of an improved instrument probe of the present invention installed in a riser conduit positioned in a vessel through which conduit an erosive process stream is passed.

FIG. 1 is a schematic illustration of an instrument probe of the present invention having an aerodynamically shaped outer casing 10 located in a riser conduit 5 through which an erosive process fluid flows. In the embodiment shown in FIG. 1, the riser conduit 5 is positioned within a reactor vessel having a wall 11.

As can be seen by the arrows, process fluid flowing through the reactor is directed to flow around the outer casing 10 in a substantially aerodynamic fashion, so as to be substantially non-disruptive of the flow of fluid through the riser conduit 5, thereby preventing erosion of the housing within the casing 10 containing the sensor.

In a particularly preferred embodiment of the present invention, the outer casing 10 of the instrument probe has a substantially air foil design and particularly the design shown in FIG. 2.

As is shown in FIG. 3, the instrument probe includes a tubular housing member 14 of sufficient length to extend from a point within the conduit 5 to a location external the conduit 5. In this particular instance where the conduit containing the process stream is located within a vessel, the tubular housing 14 is preferably sufficiently long to extend to a location external the reactor vessel wall 11. As shown, the end of the tubular housing 14 that extends into the process stream to be sensed is surrounded by outer casing 10.

As can be seen from FIGS. 2 and 3, the outer casing has a substantially aerodynamic shape, especially an outer shape 10 similar to an air foil. Thus, the outer casing 10 has three sections: a first section 16, a middle second section 17 and a third section 18. Preferably, the outer casing 10 is a solid unit with a cylindrical tubular opening therein which is transverse to its longitudinal axis and has a diameter sufficient to be able to readily receive and remove tubular housing 14. The outer casing 10, preferably, is welded to the tubular housing 14 at the first end 15 of housing 14 by weld 27. The outer casing 10 optionally and preferably is also welded to the conduit 5 by welds 8.

In the embodiment shown in FIG. 3, the conduit 5 and the reactor vessel wall 11 are each provided with a refractory lining 6.

Importantly, as can be seen in FIG. 2, the casing 10 of the probe has a first section 16 with a curved leading edge 26 and a third section 18 with a curved trailing edge 28.

Also as can be seen in the figures, the first section 16 of the outer casing 10 is slightly longer in length than the third section 18 of the casing 10. Indeed, as shown in FIG. 2, in a particularly preferred embodiment of the present invention, the length from leading edge 26 to the center of the cylindrical opening in outer casing 15 is from 2 to 4 times the radius of the cylindrical opening; whereas, the length from the trailing edge 28 to the center of the cylindrical opening is about 2 to 2½ times the radius of the cylindrical opening.

In the embodiment shown in FIG. 3, a mounting plate 34 is provided to secure the tubular housing 14 to the conduit 5 and to effectively provide a gas seal between the interior and the exterior of conduit 5. Also as is shown, the mounting plate 34 is fastened to the wall of conduit 5 by means of welds and optionally and preferably the tubular housing 14 is welded to mounting plate 34.

As is shown in FIG. 3, a sensing element such as a thermocouple 32 is located within a tubular housing 14, extending substantially inward toward weld 27, thereby providing the primary means for measuring temperature within the process stream. The second end 25 of the tubular housing 14 is provided with conventional means 36, such as a threaded end, for connection to external equipment and devices.

As will be readily appreciated, the outer casing 10 can be separately fabricated and placed over conventional thermocouple probes in use by welding at points such as 27 and 8, shown in FIG. 3.

In the practice of the present invention, the outer casing 10 will be made from metals such as 316 stainless steel; however, optionally it may be also coated with erosion resistant coating such as carbides, borides and aluminides, alloys of iron, nickel, cobalt, especially wear resistant alloys of cobalt-chromium and tungsten, and ceramics such as magnesia-stabilized zirconia.

Although the invention has been described specifically in connection with a riser conduit positioned within a reactor, it should be readily appreciated that the improved instrument probe is equally useful in fluid coking apparatus such as transfer lines, catalyst regenerators and the like, as well as other erosive environments requiring instrument probes.

What is claimed is:

1. An improved instrument probe for use in erosive process streams comprising:
   a tubular housing sized to enclose a sensing element;
   an outer casing having a tubular opening therein surrounding the tubular housing, the outer casing being aerodynamically shaped to be substantially non-disruptive of the process stream and to direct the entire process stream around the casing, wherein the tubular housing is protected from erosion.

2. The probe of claim 1 wherein the outer casing has a substantially air foil shape.

3. The probe of claim 1 wherein the tubular opening in the casing is cylindrical and is transverse to the longitudinal axis of the casing.

4. The probe of claim 3 wherein the casing has a first leading curved edge that is located from the center of the cylindrical opening at a distance from 2 to 4 times the radius of the cylindrical opening and a second trailing edge that is located from the center of the cylindrical opening at a distance of 2 to 2½ times the radius of the cylindrical opening.

5. The probe of claim 4 including an erosion resistant coating on the casing.

6. An instrument probe for use in erosive process streams comprising:
   a tubular housing sized to enclose a sensing element, the tubular housing having a first end for projecting into a process stream and a second end for location external a process stream;
   an outer casing surrounding the first end of the tubular housing, the outer casing having a substantially air foil shape with a cylindrical opening transverse to the longitudinal axis of the casing, the cylindrical opening having a diameter sufficient to insert and remove the first end of the tubular housing therefrom, the outer casing having a first leading curved edge that is located from the center of the cylindrical opening at a distance from 2 to 4 times the radius of the cylindrical opening, a second trailing edge that is located from the center of the cylindrical opening at a distance of 2 to 2½ times the radius of the cylindrical opening wherein the outer casing is substantially non-disruptive of the process stream and directs the entire process stream around the casing thereby protecting the tubular housing from erosion.

* * * * *